United States Patent
Vare et al.

(10) Patent No.: US 8,261,308 B2
(45) Date of Patent: Sep. 4, 2012

(54) MAPPING OF NETWORK INFORMATION BETWEEN DATA LINK AND PHYSICAL LAYER

(75) Inventors: Jani Vare, Kaarina (FI); Jussi Vesma, Turku (FI)

(73) Assignee: Nokia Corporation, Espoo (FI)

( * ) Notice: Subject to any disclaimer, the term of this patent is extended or adjusted under 35 U.S.C. 154(b) by 999 days.

(21) Appl. No.: 12/017,242

(22) Filed: Jan. 21, 2008

(65) Prior Publication Data

US 2009/0187949 A1 Jul. 23, 2009

(51) Int. Cl.
*H04N 7/16* (2011.01)
(52) U.S. Cl. ............... 725/62; 455/422.1; 455/434
(58) Field of Classification Search ....... 455/422.1–466
See application file for complete search history.

(56) References Cited

U.S. PATENT DOCUMENTS

| | | | |
|---|---|---|---|
| 6,018,528 A * | 1/2000 | Gitlin et al. ............. | 370/436 |
| 7,751,366 B2 * | 7/2010 | Kwon ..................... | 370/331 |
| 2003/0100325 A1 | 5/2003 | Paila et al. | |
| 2006/0084435 A1 | 4/2006 | Borsos et al. | |
| 2007/0173194 A1 | 7/2007 | Vare et al. | |
| 2007/0300275 A1* | 12/2007 | Kim et al. ............... | 725/112 |
| 2008/0216113 A1* | 9/2008 | Yun et al. ............... | 725/33 |
| 2009/0262679 A1* | 10/2009 | Kim et al. ............... | 370/328 |
| 2010/0290561 A1* | 11/2010 | Ko et al. ................ | 375/298 |

FOREIGN PATENT DOCUMENTS

| | | |
|---|---|---|
| EP | 1898654 A1 | 3/2008 |
| WO | 03045054 A1 | 5/2003 |
| WO | 2006123216 A2 | 11/2006 |

OTHER PUBLICATIONS

International Search Report from International Application No. PCT/FI2009/000008 dated May 18, 2009, 15 pages.
Russian Application No. 2010134491/07 (048922) Office Action dated Sep. 5, 2011.
Tero Jokela et al., "L1 signalling parameter definition and signaling transmission in T2," Nokia & Panasonic, Nov. 2, 2007, 22 pages.
ETSI EN 300 468 V1.7.1 (May 2006) Digital Video Broadcasting (DVB); Specification for Service Information (SI) in DVB systems, 107 pages.
Chinese Application No. 200980102730 First Office Action dated Jul. 4, 2011.
Chinese Patent Application No. 200980102730.X Second Office Action dated May 4, 2012, including English translation.

* cited by examiner

*Primary Examiner* — Pankaj Kumar
*Assistant Examiner* — Timothy Newlin
(74) *Attorney, Agent, or Firm* — Banner & Witcoff Ltd.

(57) ABSTRACT

Aspects of the invention are directed to a cell-frequency-link descriptor configured to map network-specific parameters with time frequency slicing (TFS) information in a digital video broadcast system. The cell-frequency-link descriptor may include fields that provide a mapping between a cell identifier, a TFS group identifier, a bandwidth, a guard interval, a transmission mode, and a frequency. The fields may provide a mapping between cells, frequencies, TFS groups, related guard intervals, bandwidths, and transmission modes for multiple cells within the digital video broadcast system. The fields may include: a cell identifier field, a TFS-group identifier field, a bandwidth field, a guard interval field, a transmission mode field, a frequency field, a cell identifier extension field, and a transposer frequency field.

22 Claims, 9 Drawing Sheets

| Syntax | Number of bits | Identifier |
|---|---|---|
| T2_cell_frequency_link_descriptor(){ | | |
|     descriptor_tag | 8 | uimsbf |
|     descriptor_length | 8 | uimsbf |
|     descriptor_tag_extension | 8 | uimsbf |
|     for (i=0;i<N;I++){ | | |
|         cell_id | 16 | uimsbf |
|         TFS_group_id | 8 | uimsbf |
|         Reserved_future_use | 1 | uimsbf |
|         Bandwidth | 3 | uimsbf |
|         guard_interval | 2 | uimsbf |
|         Transmission_mode | 2 | uimsbf |
|         frequency_loop_length | 8 | uimsbf |
|         for (j=0;j<N;j++){ | | |
|             frequency | 32 | uimsbf |
|         } | | |
|         subcell_info_loop_length | 8 | uimsbf |
|         for (k=0;k<N;k++){ | | |
|             cell_id_extension | 8 | uimsbf |
|             transposer_frequency | 32 | uimsbf |
|         } | | |
|     } | | |
| } | | |

MAPPING OF NETWORK INFORMATION BETWEEN DATA LINK AND PHYSICAL LAYER

FIELD

Embodiments relate generally to communications networks. More specifically, embodiments relate to mapping network specific parameters with Time Frequency Slicing (TFS) information.

BACKGROUND

Digital broadband broadcast networks enable end users to receive digital content including video, audio, data, and so forth. Using a mobile terminal, a user may receive digital content over a wireless digital broadcast network. Digital content can be transmitted in a cell within a network. A cell may represent a geographical area that may be covered by a transmitter in a communication network. A network may have multiple cells, and cells may be adjacent to other cells.

A receiver device, such as a mobile terminal, may receive a program or service in a data or transport stream. The transport stream carries individual elements of the program or service such as the audio, video, and data components of a program or service. Typically, the receiver device locates the different components of a particular program or service in a data stream through Program Specific Information (PSI) or Service Information (SI) embedded in the data stream. However, PSI or SI signalling may be insufficient in some wireless communications systems, such as Digital Video Broadcasting-Handheld (DVB-H) systems. Use of PSI or SI signalling in such systems may result in a sub-optimal end user experience as the PSI and SI tables carrying in PSI and SI information may have long repetition periods. In addition, PSI or SI signalling requires a relatively large amount of bandwidth which is costly and also decreases efficiency of the system.

In certain digital video broadcast systems (e.g., DVB-T2, enhanced Digital Video Broadcast Terrestrial), it may be desirable to map network specific parameters with the Time Frequency Slicing (TFS) structure. Due to the physical layer structure of such digital video broadcast systems, transport stream identification may be redundant. Instead, identification of a TFS group, which is a combination of one or more frequencies carrying one or more PLPs (Physical Layer Pipes), may be desirable.

In DVB-T (Digital Video Broadcast Terrestrial), the Network Information Table (NIT) may be used mainly for mapping transport streams with modulation parameters and with geographical coverage area of each signal carrying the transport streams. Also, some other information may be provided by NIT, such as, network name.

Certain DVB systems may map between modulation parameters and transport streams. A transport stream carried within such systems may no longer be referenced with a single set of modulation parameters. Instead, each PLP may have, e.g., different modulation (i.e. constellation) and coding (i.e. code rate) and may carry several transport streams. Hence, a conventional terrestrial-delivery-system descriptor would not be sufficient for such DVB systems. Also, a conventional cell-frequency-link descriptor is not optimized for such a DVB system, since it is lacking a loop for the frequencies and hence would result in unnecessary overhead.

Further, there is no provision in the current PSI/SI (Program Specific Information/Service information) for mapping each TFS group with the network parameters, such as cells and their location.

As such, improved techniques for mapping network-specific parameters with the TFS structure would advance the art.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Aspects of the invention are directed to a descriptor configured to map network-specific parameters with time frequency slicing (TFS) information in a digital video broadcast system. Such a descriptor is called a cell-frequency-link descriptor in the following description. The cell-frequency-link descriptor may include fields that provide a mapping between a cell identifier, a TFS group identifier, a bandwidth, a guard interval, a transmission mode, and a frequency. The fields may provide a mapping between cells, frequencies, TFS groups, related guard intervals, bandwidths, and transmission modes for multiple cells within the digital video broadcast system. The fields may include: a cell-identifier field, a TFS group identifier field, a bandwidth field, a guard interval field, a transmission mode field, a frequency field, a cell-identifier-extension field, and a transposer frequency field.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
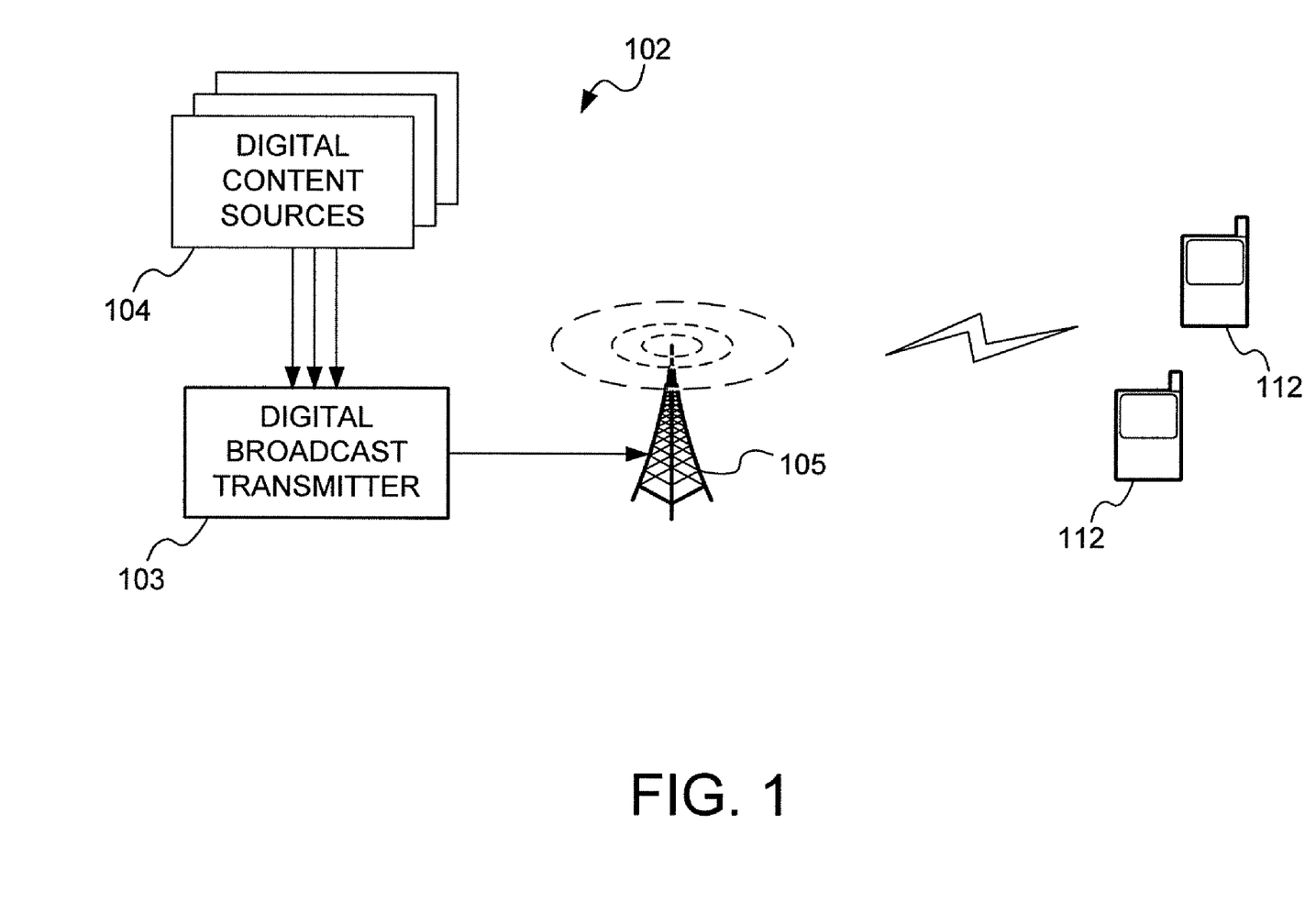
FIG. 1 illustrates a suitable digital broadband broadcast system in which one or more illustrative embodiments of the invention may be implemented.

FIG. 1 illustrates a suitable digital broadband broadcast system 102 in which one or more illustrative embodiments may be implemented. Systems such as the one illustrated here may utilize a digital broadband broadcast technology, for example Digital Video Broadcast-Handheld (DVB-H) or next generation DVB-H networks. Examples of other digital broadcast standards which digital broadband broadcast system 102 may utilize include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple digital content data streams from multiple digital content sources 104. In various embodiments, the digital content data streams may be IP streams. The processed digital content may then be passed to digital broadcast tower 105 (or other physical transmission component) for wireless transmission. Ultimately, mobile terminals or devices 112 may selectively receive and consume digital content originating from digital content sources 104.

Figure 2:
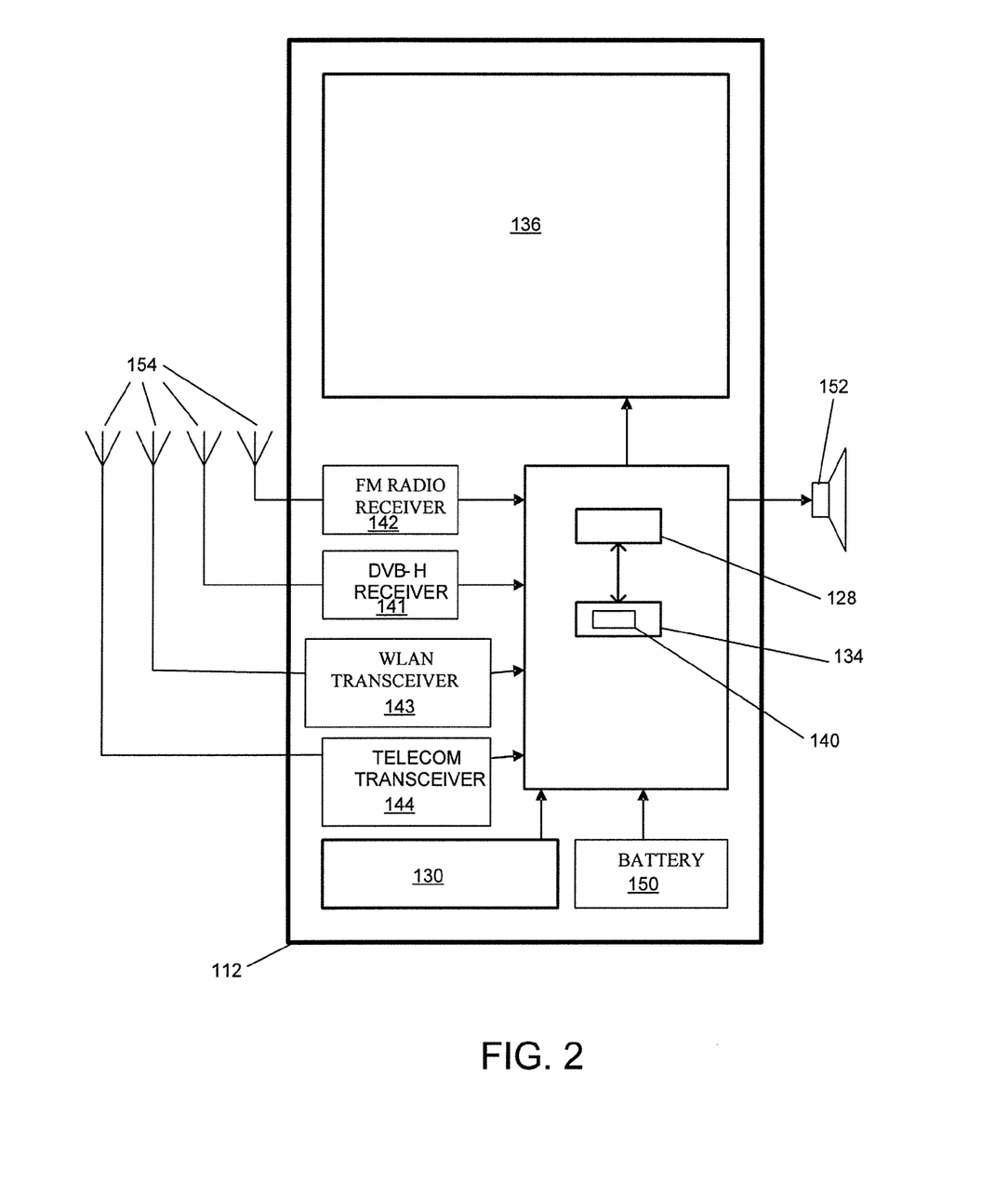
FIG. 2 illustrates an example of a mobile device in accordance with an aspect of the present invention.

As shown in FIG. 2, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, touch screen, voice interface, one or more arrow keys, joy-stick, data glove, mouse, roller ball, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-T, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an Electronic Service Guide (ESG) may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-handheld (DVB-H). The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having an unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

Figure 3:
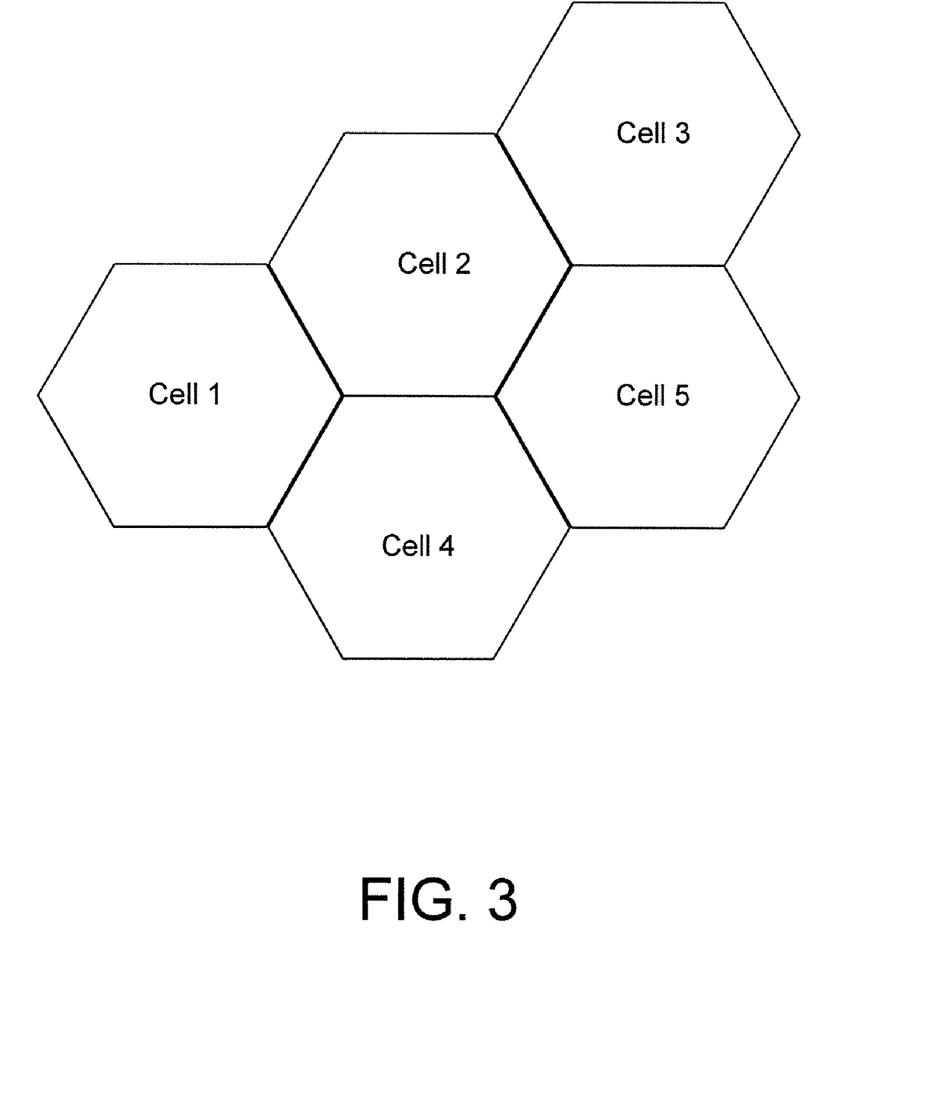
FIG. 3 illustrates an example of cells schematically, each of which may be covered by a different transmitter in accordance with an aspect of the present invention.

In a typical communication system, a cell may define a geographical area that may be covered by a transmitter. The cell may be of any size and may have neighboring cells. FIG. 3 illustrates schematically an example of cells, each of which may be covered by one or more transmitter each transmitting in the same frequency. In this example, Cell 1 represents a geographical area that is covered by one or more transmitter transmitting on a certain frequency. Cell 2 is next to Cell 1 and represents a second geographical area that may be covered by a different frequency. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

As discussed above in more detail in the Background section, in certain digital video broadcast systems (e.g., DVB-T2, enhanced Digital Video Broadcast Terrestrial), it may be desirable to map the network specific parameters with the Time Frequency Slicing (TFS) structure. To accomplish this, and to address the other issues discussed in the Background section, a new descriptor may be defined. The descriptor may be referred to as a cell-frequency-link descriptor or a T2_cell_frequency_link_descriptor. The descriptor may be based on a combination of the terrestrial_delivery_system_descriptor and cell_frequency_link_descriptor of the DVB-T (Digital Video Broadcast-Terrestrial) standard as described in ETSI EN 300 468; Digital Video Broadcasting (DVB); Specification for Service Information (SI) in DVB systems; V1.7.1 (2006-05).

Figure 4:
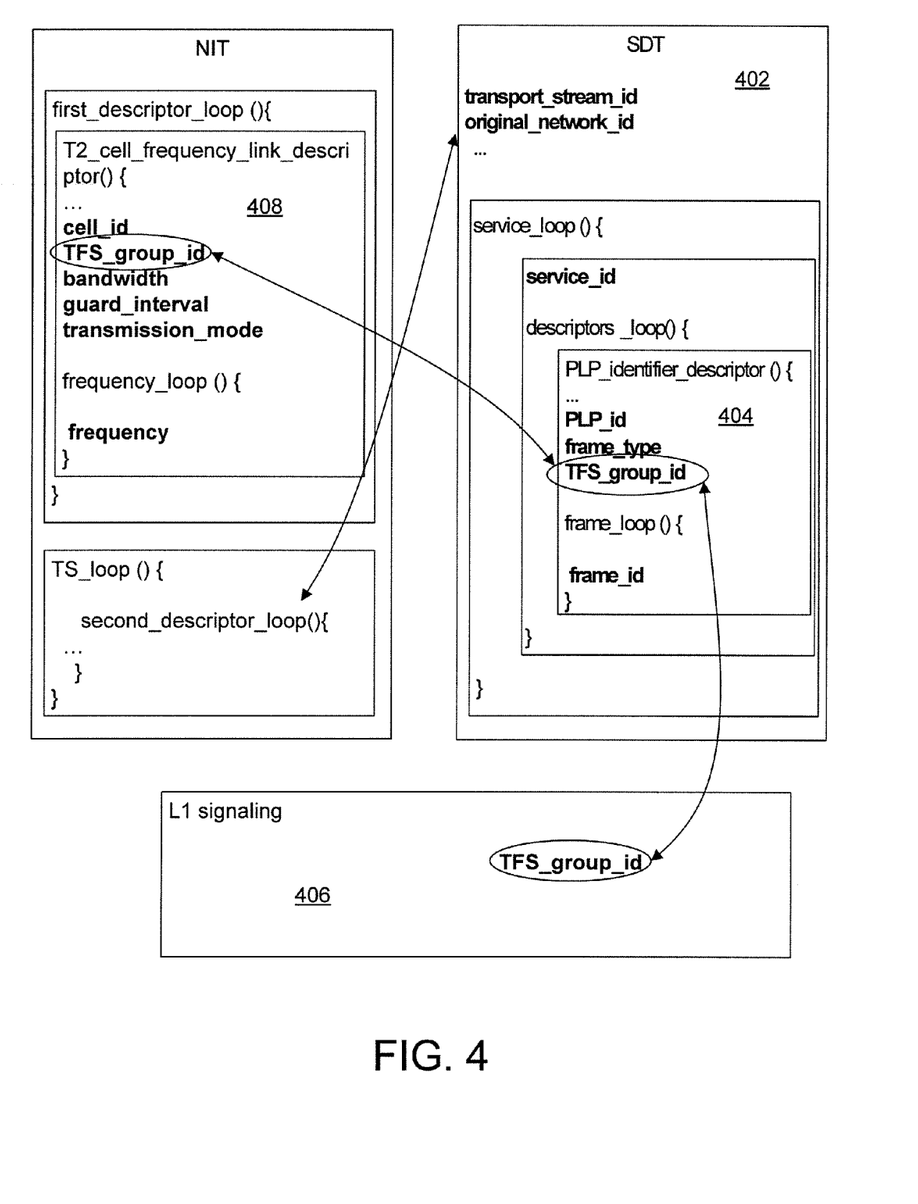
FIG. 4 shows descriptors in accordance with certain embodiments.

FIG. 4 shows descriptors in accordance with certain embodiments. Each Service Description Table (SDT) 402 may carry a PLP-identifier descriptor 404, which provides a mapping between services and PLPs. Furthermore, the PLP-identifier descriptor may also map each service and PLP with a TFS-group identifier. This mapping is shown in FIG. 4 by the double-headed arrow between TFS-group identifier in the PLP-identifier descriptor and TFS-group identifier in L1 signalling 406. L1 refers to layer 1 in the OSI model, that is, the physical layer.

The T2_cell_frequency_link_descriptor 408 provides a mapping between cell identifier, TFS-group identifier, bandwidth, guard interval, transmission mode, and frequency.

The identifiers identifying the transport stream, i.e., transport-stream identifier, transport_stream_id, and original-network identifier, original_network_id, in the SDT 402 are part of service identification. Service is uniquely referenced with a triplet of: original-network identifier, transport-stream identifier, and service identifier. As such, there is no need to return to the second descriptor loop for getting transmission parameters for the cell, since these are provided within the T2-cell_frequency-link-descriptor, where cell is mapped with TFS group identifier, frequency, bandwidth, guard interval, and transmission mode.

Through the T2_cell frequency_link_descriptor 408, a receiver is also able to discover each neighboring cell when mobile/portable receivers are used.

The L2 signalling comprising different PSI/SI tables may, in one embodiment, be carried in one PLP that may be dedicated for L2 signalling. In other embodiments, the L2 signalling may be carried in one PLP carrying content (e.g., program) data or distributed among several PLPs that also carry content (e.g., program) data. L2 refers to layer 2 in the OSI model, that is, the data-link layer.

Figure 5:
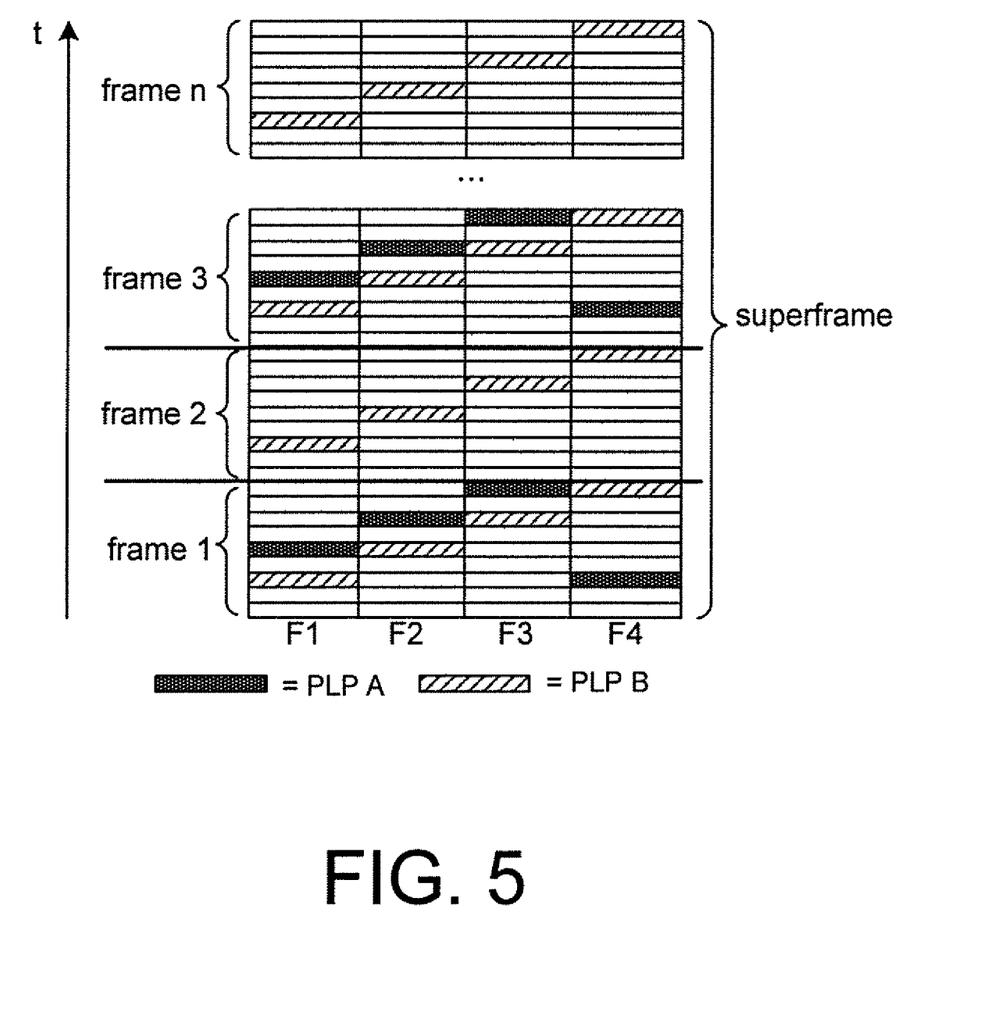
FIG. 5 shows an example of a TFS group in accordance with certain embodiments.

FIG. 5 shows an example of a TFS group in accordance with certain embodiments. As shown in FIG. 5, frames from 1 ... n are allocated for one super frame. Frame 1 carries PLP A and PLP B, of which PLP B is also carried in the next frame, i.e. frame 2. Hence PLP B is a PLP that reserves one slot within each frequency F1, ..., F4 and within each frame. PLP A, in turn, is a PLP which reserves one slot within each frequency in alternate frames (e.g., the odd-numbered frames). Both PLPs may reserve a slot from each frequency of the frame where they are available. The length of the slots may be measured in terms of a number of OFDM symbols or fractions of OFDM symbols. The number of slots in a frame as well as the number of frequencies in a TFS group may vary between different TFS groups.

A certain frequency can belong only to one TFS group. The services transmitted in a TFS group are identified by the transport_stream_id, original_network_id, and service_id. A certain service can be transmitted in one or multiple TFS groups.

A TFS group may also be referred to as "T2 multiplex" or "T2 Transport stream." In accordance with certain embodiments, a TFS group may be mapped to network specific parameters, such as, a cell identifier.

The cell-frequency-link descriptor 408 may provide a mapping between cells, frequencies, TFS groups, related guard interval, bandwidth, and transmission mode of each cell.

By using information carried within this descriptor, a receiver may be able to directly associate TFS group, a set of frequencies and cells, and their locations. Through this information, a receiver may discover, for example, neighboring cells in mobile and portable receivers.

Figure 6:
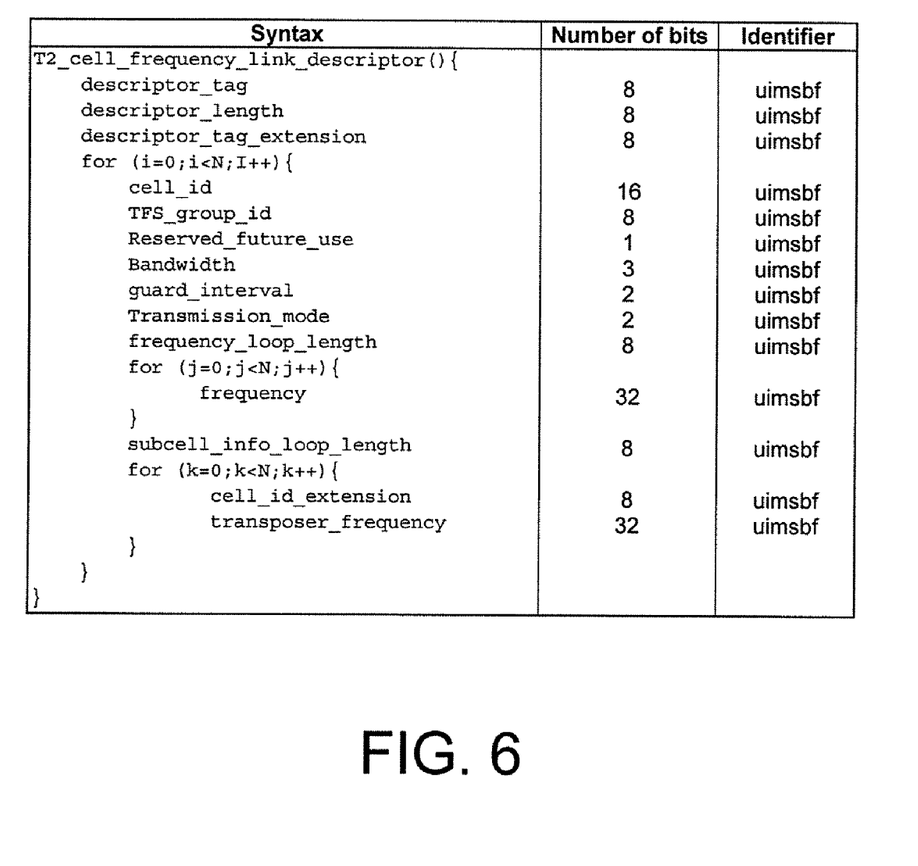
FIG. 6 shows an example structure of a cell-frequency-link descriptor in accordance with certain embodiments.

FIG. 6 shows an example structure of a cell-frequency-link descriptor in accordance with certain embodiments. The number of bits indicated for each field in FIG. 6 is exemplary for one embodiment. In other embodiments, the number of bits may be different.

Semantics for the various fields of the cell-frequency-link descriptor may be as follows.

cell_id: This is a 16-bit cell-identifier field which uniquely identifies a cell within a network.

TFS_group_id: This TFS-group identifier field uniquely identifies a TFS group.

bandwidth: This is a 3-bit field specifying the bandwidth in use. In one embodiment the coding of this field may be done as in Table 43 of ETSI EN 300 468 as follows:

| Bandwidth | Bandwidth value |
|---|---|
| 000 | 8 MHz |
| 001 | 7 MHz |
| 010 | 6 MHz |
| 011 | 5 MHz |
| 100 to 111 | reserved for future use | guard_interval: The guard_interval is a 2-bit field specifying signalling format for each of the guard interval values. In one embodiment, the coding may be done as in Table 48 of ETSI EN 300 468 as follows:

| guard_interval | Guard interval values |
|---|---|
| 00 | 1/32 |
| 01 | 1/16 |
| 10 | 1/8 |
| 11 | 1/4 | transmission_mode: This 2-bit field indicates the FFT size as the number of carriers in a DVB system. In one embodiment, the coding may be done as in Table 49 of ETSI EN 300 468 as follows:

| transmission_mode | Description |
|---|---|
| 00 | 2k mode |
| 01 | 8k mode |
| 10 | 4k mode |
| 11 | Reserved for future use | frequency: In one embodiment the frequency is a 32-bit field giving the binary coded frequency value in multiples of 10 Hz. The coding range is from a minimum of 10 Hz (0x00000001) up to a maximum of 42,949,672,950 Hz (0xFFFFFFFF). The given frequency may be an absolute frequency, which includes frequency offsets, i.e., deviation from the nominal center frequency of the channel.

cell_id_extension: This 8-bit cell-identifier-extension field is used to identify a sub-cell within a cell.

transposer_frequency: This 32-bit field identifies the frequency that is used by a transposer in the sub-cell indicated. The coding of the transposer_frequency may be according to the coding of the frequency.

Figure 7:
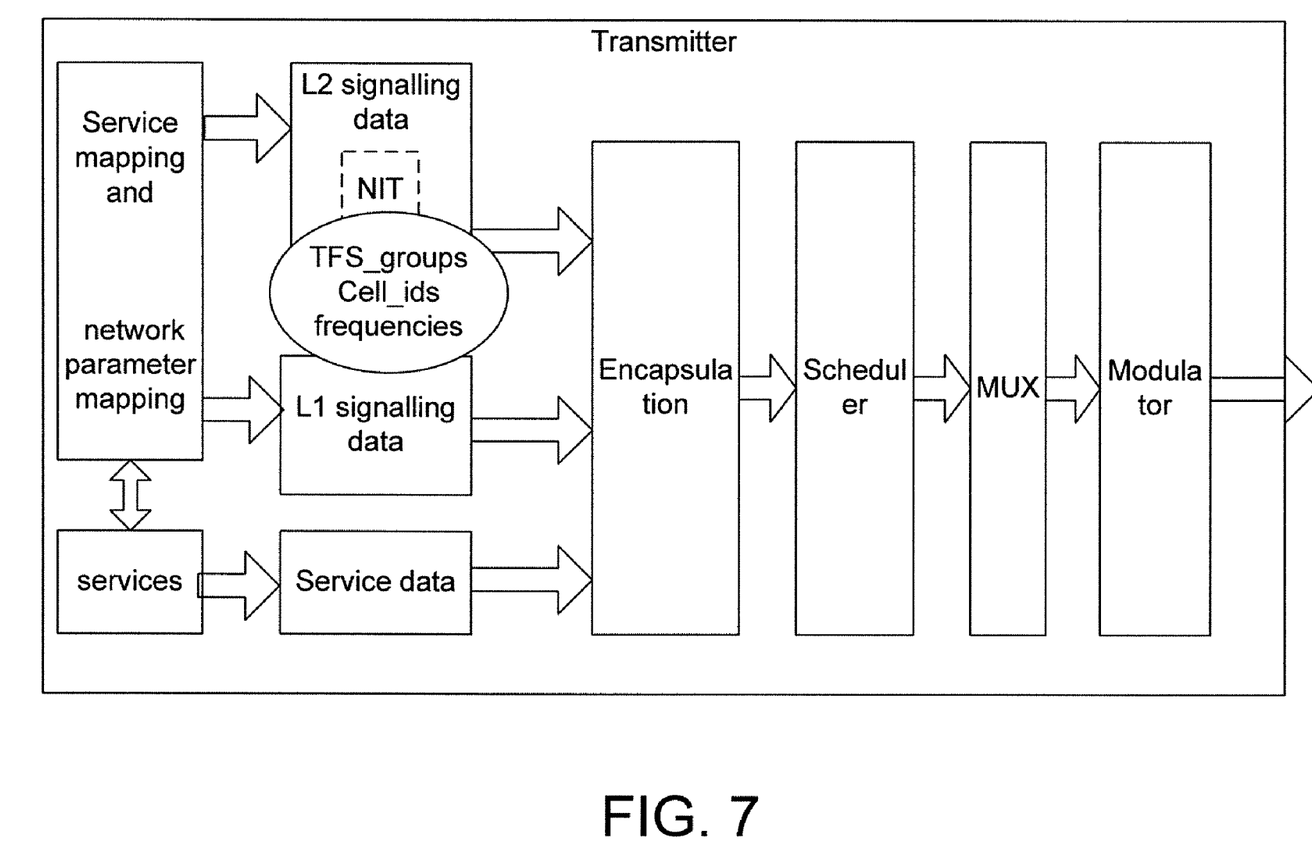
FIG. 7 is a schematic diagram of a transmitter in accordance with certain embodiments.

FIG. 7 is a schematic diagram of a transmitter in accordance with certain embodiments. The transmitter of FIG. 7 may transmit digital video broadcast data that includes a cell-frequency-link descriptor configured to map network-specific parameters with time frequency slicing information. The cell-frequency-link descriptor may include a plurality of fields that provide a mapping between a cell identifier, a TFS-group identifier, a bandwidth, a guard interval, a transmission mode, and a frequency.

Figure 8:
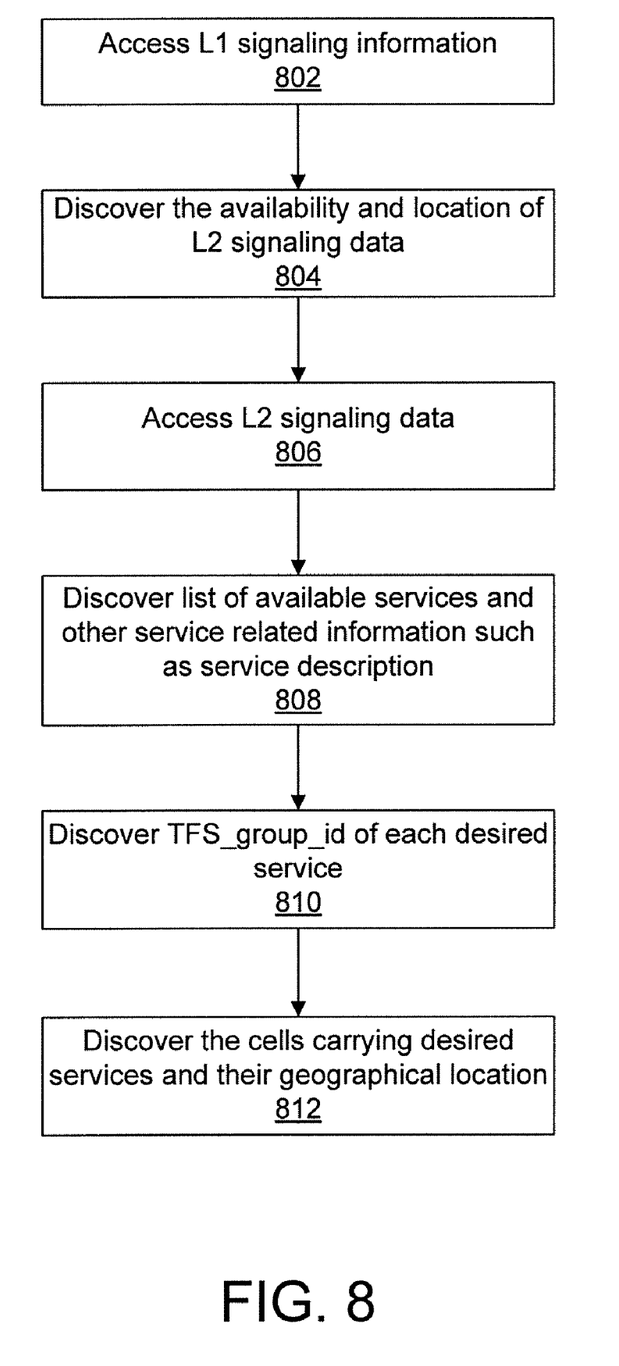
FIG. 8 is a flow diagram showing steps performed by a receiver in accordance with certain embodiments.

FIG. 8 is a flow diagram showing steps performed by a receiver in accordance with certain embodiments. The receiver accesses the L1 information, as shown at 802. The L2 signalling information (i.e. Program Specific Information/Service Information (PSI/SI)) can be detected and accessed based on the L1 signalling information, which is shown at 804.

The receiver then accesses the SDT and Event Information Table (EIT) to search a list of available services and to investigate the description of each service, as shown at 806. For this purpose, a receiver may construct an electronic program guide (EPG) based on this information.

For each desired service, the receiver may discover a corresponding Program Map Table (PMT), as shown at 808. This may be done based on the service identifier announced within the SDT and Program Association Table (PAT), which ultimately maps each service identifier with a corresponding PMT.

The TFS-group identifier is discovered from L1 for the current TFS group, as shown at 810. The TFS-group identifiers of the other TFS groups can be detected via the cell-frequency-link descriptor and the associated services of each group can be detected through the PLP-identifier descriptor located within the SDT.

The geographical location of each cell carrying a desired service may be detected through the mapping of the cell-frequency-link descriptor, which gives a cell identifier for each TFS group and finally through the cell-list descriptor in the NIT. The cell-list descriptor maps each cell identifier with a geographical location.

Figure 9:
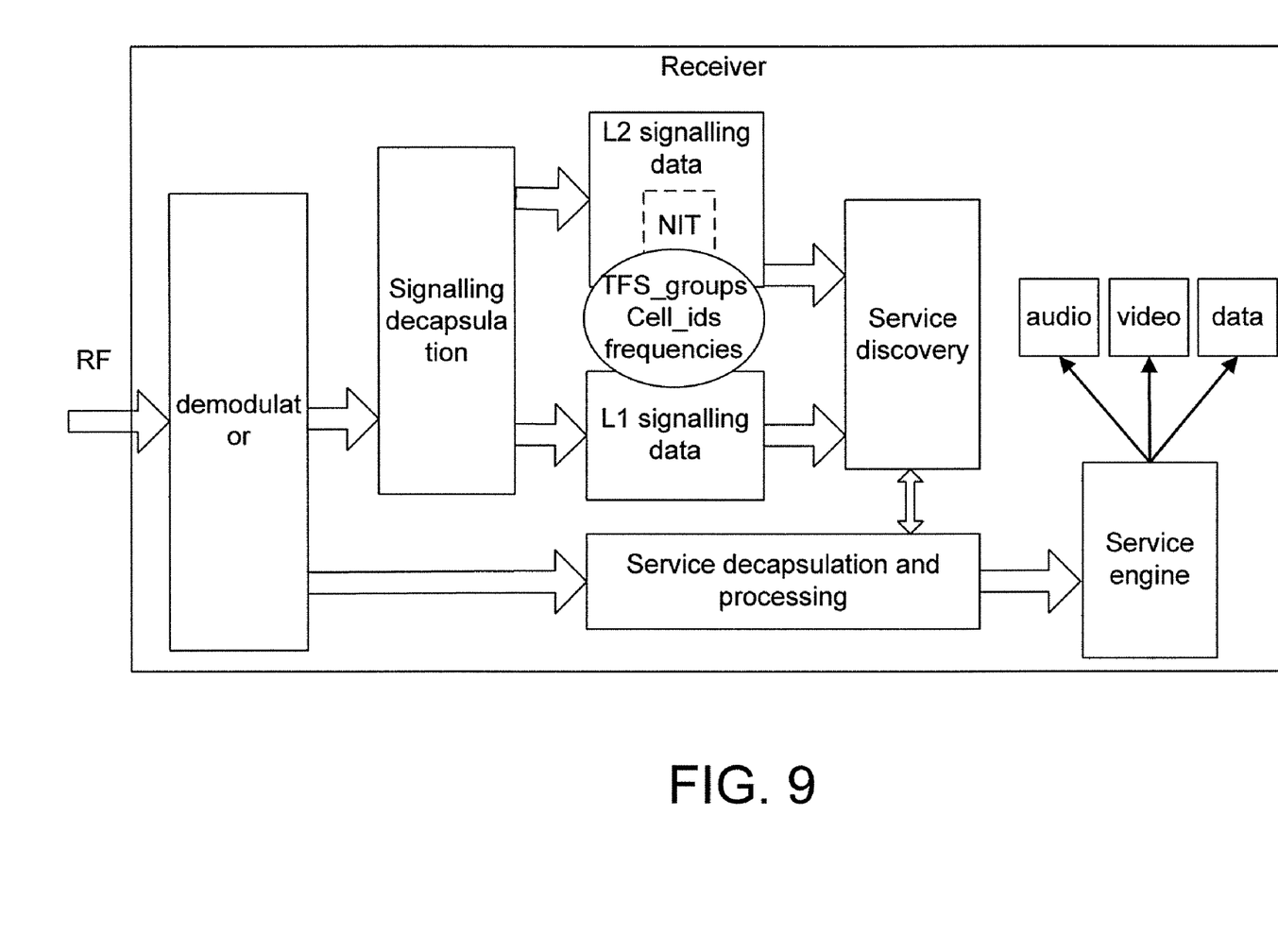
FIG. 9 is a schematic diagram of a receiver in accordance with certain embodiments.

FIG. 9 is a schematic diagram of a receiver in accordance with certain embodiments. As shown in FIG. 9, a radio frequency (RF) signal is input to the demodulator, which outputs demodulated data. Signalling decapsulation module then decapsulates the data, and L2 signalling data and L1 signalling data are input to service discovery module, which communicates with the service decapsulation and processing module. The service decapsulation and processing module outputs data to the service engine, which outputs audio, video, and data.

Certain embodiments enable unique referencing of service to cells and Time Frequency Slicing (TFS) groups as well as defining transmission streams in the TFS context.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:
1. A method comprising:
    accessing at least one of a service description table and an event information table to gather information about one or more available services;
    discovering, for the one or more available services, one or more corresponding program map tables;

discovering, by a processor, a time frequency slicing group identifier from physical layer signalling data for a current time frequency slicing group;

processing a network information table to identify a cell frequency link descriptor corresponding to the discovered time frequency slicing group identifier; and detecting, through a mapping of the cell frequency link descriptor that corresponds to the discovered time frequency slicing group identifier and through a cell list descriptor in the network information table, a geographical location of one or more cells carrying the one or more available services.

2. The method of claim 1, wherein accessing at least one of the service description table and the event information table to gather the information about one or more available services further comprises: accessing physical layer information upon which data link layer signalling information can be detected and accessed.

3. The method of claim 1, wherein discovering, for the one or more available services, the one or more corresponding program map tables is based on a service identifier announced within the service description table and a program association table that maps one or more service identifiers with one or more corresponding program map tables.

4. The method of claim 1, further comprising: detecting one or more additional time frequency slicing group identifiers of one or more additional time frequency slicing groups via the cell frequency link descriptor.

5. The method of claim 4, further comprising: detecting associated services for the one or more additional time frequency slicing groups through a physical layer pipe identifier descriptor located within the service description table.

6. The method of claim 1, wherein the cell frequency link descriptor comprises a plurality of cell identifiers for a corresponding plurality of time frequency slicing groups.

7. An apparatus comprising:
a processor; and
a memory containing executable instructions, the memory and the executable instructions configured to, with the processor, cause the apparatus to at least:
access at least one of a service description table and an event information table to gather information about one or more available services;
discover, for the one or more available services, one or more corresponding program map tables;
discover a time frequency slicing group identifier from physical layer signalling data for a current time frequency slicing group;
process a network information table to identify a cell frequency link descriptor corresponding to the discovered time frequency slicing group identifier; and
detect, through a mapping of the cell frequency link descriptor that corresponds to the discovered time frequency slicing group identifier and through a cell list descriptor in the network information table, a geographical location of one or more cells carrying the one or more available services.

8. The apparatus of claim 7, wherein accessing at least one of the service description table and the event information table to gather the information about one or more available services further comprises: accessing physical layer information upon which data link layer signalling information can be detected and accessed.

9. The apparatus of claim 7, wherein discovering, for the one or more available services, the one or more corresponding program map tables is based on a service identifier announced within the service description table and a program association table that maps one or more service identifiers with one or more corresponding program map tables.

10. The apparatus of claim 7, wherein the memory comprises additional executable instructions that, when executed by the processor, cause the apparatus to detect one or more additional time frequency slicing group identifiers of one or more additional time frequency slicing groups via the cell frequency link descriptor.

11. The apparatus of claim 10, wherein the memory comprises additional executable instructions that, when executed by the processor, cause the apparatus to detect associated services for the one or more additional time frequency slicing groups through a physical layer pipe identifier descriptor located within the service description table.

12. The apparatus of claim 7, wherein the cell frequency link descriptor comprises a plurality of cell identifiers for a corresponding plurality of time frequency slicing groups.

13. A method comprising:
generating, by a processor, and causing transmission of, digital video broadcast data that comprises a network information table comprising a cell frequency link descriptor and a cell list descriptor, the cell frequency link descriptor being configured to map network specific parameters with time frequency slicing information, wherein the cell frequency link descriptor comprises a plurality of fields that provide a mapping between a cell identifier, a time frequency slicing group identifier, a bandwidth, a guard interval, a transmission mode, and a frequency, wherein a geographical location of a cell carrying an available service is indicated through a mapping of the cell frequency link descriptor that corresponds to the time frequency slicing group identifier and through the cell list descriptor in the network information table.

14. The method of claim 13, wherein the plurality of fields provides a mapping between cells, frequencies, time frequency slicing groups, related guard intervals, bandwidths, and transmission modes of a plurality of cells.

15. The method of claim 13, wherein the plurality of fields comprises: a cell identifier field configured to uniquely identify a cell within a network, a time frequency slicing group identifier field configured to uniquely identify a time frequency slicing group, a bandwidth field configured to specify a bandwidth in use, a guard interval field configured to specify a plurality of, signaling formats for a plurality of corresponding guard interval values, a transmission mode field configured to indicate an FFT size as a number of carriers in a digital video broadcast system, a frequency field, a cell identifier extension field configured to identify a sub cell within a cell, and a transposer frequency field configured to identify a frequency used by a transposer in a sub cell.

16. An apparatus comprising:
a processor; and
a memory containing executable instructions, the memory and the executable instructions configured to, with the processor, cause the apparatus at least to:
generate and cause transmission of digital video broadcast data that comprises a network information table comprising a cell frequency link descriptor and a cell list descriptor, the cell frequency link descriptor being configured to map network specific parameters with time frequency slicing information, wherein the cell frequency link descriptor comprises a plurality of fields that provide a mapping between a cell identifier, a time frequency slicing group identifier, a bandwidth, a guard interval, a transmission mode, and a frequency, wherein a geographical location of a cell carrying an available service is indicated through a mapping of the cell frequency link descriptor that corresponds to the time frequency slicing group identifier and through the cell list descriptor in the network information table.

17. The apparatus of claim 16, wherein the plurality of fields provides a mapping between cells, frequencies, time frequency slicing groups, related guard intervals, bandwidths, and transmission modes of a plurality of cells.

18. The apparatus of claim 17, wherein the plurality of fields comprises: a cell identifier field configured to uniquely identify a cell within a network, a time frequency slicing group identifier field configured to uniquely identify a time frequency slicing group, a bandwidth field configured to specify a bandwidth in use, a guard interval field configured to specify a plurality of signaling formats for a plurality of corresponding guard interval values, a transmission mode field configured to indicate an FFT size as a number of carriers in a digital video broadcast system, a frequency field, a cell identifier extension field configured to identify a sub cell within a cell, and a transposer frequency field configured to identify a frequency used by a transposer in a sub cell.

19. A non-transitory computer readable medium having stored thereon executable instructions that, when executed, cause an apparatus at least to:
generate a network information table comprising a cell frequency link descriptor and a cell list descriptor, the cell frequency link descriptor being configured to map network specific parameters with time frequency slicing information, the cell frequency link descriptor comprising:
a plurality of fields that provide a mapping between a cell identifier, a time frequency slicing group identifier, a bandwidth, a guard interval, a transmission mode, and a frequency, wherein a geographical location of a cell carrying an available service is indicated through a mapping of the cell frequency link descriptor that corresponds to the time frequency slicing group identifier and through the cell list descriptor in the network information table.

20. The memory of claim 19, wherein the plurality of fields provides a mapping between cells, frequencies, time frequency slicing groups, related guard intervals, bandwidths, and transmission modes of a plurality of cells.

21. The memory of claim 19, wherein the plurality of fields comprises: a cell identifier field configured to uniquely identify a cell within a network, a time frequency slicing group identifier field configured to uniquely identify a time frequency slicing group, a bandwidth field configured to specify a bandwidth in use, a guard interval field configured to specify a plurality of signaling formats for a plurality of corresponding guard interval values, a transmission field configured to indicate an FFT size as a number of carriers in a digital video broadcast system, a frequency field, a cell identifier extension field configured to identify a sub cell within a cell, and a transposer frequency field configured to identify a frequency used by a transposer in a sub cell.

22. A non-transitory computer readable medium storing executable instructions that, when executed, cause an apparatus at least to:
access at least one of a service description table and an event information table to gather information about one or more available services;
discover, for the one or more available services, one or more corresponding program map tables;
discover a time frequency slicing group identifier from physical layer signalling data for a current time frequency slicing group;
process a network information table to identify a cell frequency link descriptor corresponding to the discovered time frequency slicing group identifier; and
detect, through a mapping of the cell frequency link descriptor that corresponds to the discovered time frequency slicing group identifier and through a cell list descriptor in the network information table, a geographical location of one or more cells carrying the one or more available services.

* * * * *